US012659625B2

(12) United States Patent
Ding et al.

(10) Patent No.: US 12,659,625 B2
(45) Date of Patent: Jun. 16, 2026

(54) ELECTRONIC DEVICE INCLUDING A CLOCK-GATED LATCH FOR TRANSPORTING A DEMODULATION SIGNAL TO A PIXEL ARRAY, AND METHOD AND COMPUTER PROGRAM FOR THE SAME

(71) Applicant: Sony Semiconductor Solutions Corporation, Kanagawa (JP)

(72) Inventors: Qing Ding, Stuttgart (DE); Rachit Mohan, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 929 days.

(21) Appl. No.: 17/912,054

(22) PCT Filed: Mar. 25, 2021

(86) PCT No.: PCT/EP2021/057726
§ 371 (c)(1),
(2) Date: Sep. 16, 2022

(87) PCT Pub. No.: WO2021/191345
PCT Pub. Date: Sep. 30, 2021

(65) Prior Publication Data
US 2023/0188870 A1 Jun. 15, 2023

(30) Foreign Application Priority Data
Mar. 27, 2020 (EP) ..................................... 20166158

(51) Int. Cl.
| H04N 25/76 | (2023.01) |
| G01S 17/894 | (2020.01) |
| H04N 23/60 | (2023.01) |

(52) U.S. Cl.
CPC ....... *H04N 25/7795* (2023.01); *G01S 17/894* (2020.01); *H04N 23/665* (2023.01)

(58) Field of Classification Search
CPC . H04N 23/665; H04N 25/7795; G01S 17/894
USPC ....................................................... 356/5.01
See application file for complete search history.

(56) References Cited

U.S. PATENT DOCUMENTS

| 5,990,857 A | 11/1999 | Kubota et al. | |
| 2002/0176067 A1* | 11/2002 | Charbon ................ | H04N 25/57 |
| | | | 348/E3.019 |
| 2005/0146705 A1* | 7/2005 | Lei .......................... | G01S 7/487 |
| | | | 356/5.01 |
| 2005/0179782 A1* | 8/2005 | Endo .................. | H04N 25/7795 |
| | | | 348/207.99 |
| 2007/0109282 A1 | 5/2007 | Kida et al. | |

(Continued)

FOREIGN PATENT DOCUMENTS

| CN | 108712245 A | 10/2018 |
| CN | 110109085 A | 8/2019 |

OTHER PUBLICATIONS

International Search Report and Written Opinion mailed on Apr. 29, 2021, received for PCT Application PCT/EP2021/057726, filed on Mar. 25, 2021, 15 pages.

*Primary Examiner* — Brady W Frazier
(74) *Attorney, Agent, or Firm* — XSENSUS LLP

(57) ABSTRACT
An electronic device comprising a clock-gated latch between two routing wires which transport a demodulation signal from a demodulation driver to pixels of a pixel column of a pixel array.

19 Claims, 13 Drawing Sheets

(56)　　　　References Cited

U.S. PATENT DOCUMENTS

| | | | |
|---|---|---|---|
| 2009/0026352 A1* | 1/2009 | Shimomura | H04N 25/779 |
| | | | 250/214 R |
| 2012/0033097 A1* | 2/2012 | Lim | H04N 25/7795 |
| | | | 348/222.1 |
| 2012/0154649 A1* | 6/2012 | Itzhak | H04N 25/78 |
| | | | 377/111 |
| 2013/0063404 A1 | 3/2013 | Jamshidi Roudbari et al. | |
| 2013/0201167 A1 | 8/2013 | Oh | |
| 2013/0286002 A1 | 10/2013 | Huang | |
| 2017/0237928 A1* | 8/2017 | Kusano | H03M 1/12 |
| | | | 348/294 |
| 2017/0302873 A1* | 10/2017 | Hagihara | H04N 25/78 |
| 2018/0323180 A1 | 11/2018 | Cok | |
| 2020/0018833 A1 | 1/2020 | Ding | |

* cited by examiner

ELECTRONIC DEVICE INCLUDING A CLOCK-GATED LATCH FOR TRANSPORTING A DEMODULATION SIGNAL TO A PIXEL ARRAY, AND METHOD AND COMPUTER PROGRAM FOR THE SAME

CROSS-REFERENCE TO RELATED APPLICATIONS

The present application is based on PCT filing PCT/EP2021/057726, filed Mar. 25, 2021, which claims priority to EP 20166158.4, filed on Mar. 27, 2020, the entire contents of each are incorporated herein by reference.

TECHNICAL FIELD

The present disclosure generally pertains to the field of electronic devices, in particular imaging devices and methods for imaging devices.

TECHNICAL BACKGROUND

A time-of-flight camera is a range imaging camera system that determines the distance of objects measuring the time-of-flight (ToF) of a-light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

A typical ToF camera pixel develops a charge that represents a correlation between the illuminated light and the backscattered light. To enable the correlation between the illuminated light and the backscattered light, each pixel is controlled by a common modulation input coming from one or more mixing drivers. The modulation input to the pixels is synchronous with an illumination block modulation.

The number of pixels of a ToF camera or indirect time of flight (iToF) camera can be very large. For example, a camera with 1 mega pixel has 1 million pixels. Typically, these pixels are arranged in rows and columns of pixels. The large number of pixel rows and columns can cause problems with synchrony when transmitting signals.

Therefore, it is in general desirable to improve the performance of ToF and iToF sensors with regard to the synchronicity of signal transmission.

SUMMARY

According to a first aspect the disclosure provides an electronic device comprising a clock-gated latch between two routing wires which transport a demodulation signal from a demodulation driver to pixels of a pixel column of a pixel array.

According to a further aspect the disclosure provides a method, comprising controlling a clock-gated latch which is located between two routing wires which transport a demodulation signal from a demodulation driver to pixels of a pixel column of a pixel array.

According to a further aspect the disclosure provides a computer program, comprising instructions, the instructions when executed on a processor controlling a clock-gated latch which is located between two routing wires which transport a demodulation signal from a demodulation driver to pixels of a pixel column of a pixel.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
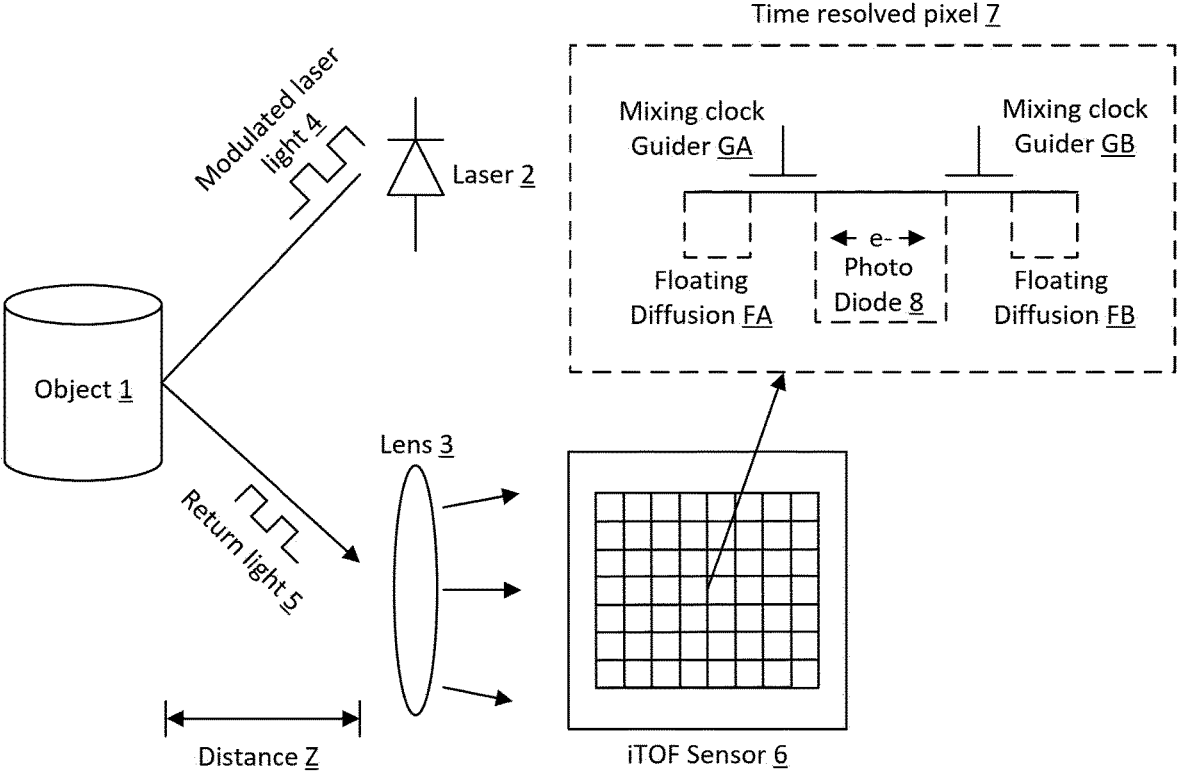
FIG. 1 illustrates schematically the basic operational principle of an indirect time-of-flight (iToF) camera.

Before a detailed description of the embodiments general explanations are made.

As mentioned in the outset, time-of-flight (ToF) cameras, are known to include a variety of methods that measure the time that light needs for traveling a distance in a medium, such, that the distance can be determined. In indirect time-of-flight (iToF) cameras calculate a phase shift between illuminated light and backscattered light for obtaining depth measurements by sampling a correlation wave, e.g. between a modulation signal for driving a light source, pixel arrays, or the like, with a signal obtained based on backscattered light.

The embodiments described below in more detail disclose an electronic device comprising a clock-gated latch between two routing wires which transport a demodulation signal from a demodulation driver to pixels of a pixel column of a pixel array.

The electronic device may for example be an image sensor, e.g. an image sensor of an indirect time of flight camera (ToF). An indirect time of flight camera may resolve distance by measuring a phase shift of an emitted light and a back scattered light. The electronic device may also be a device that comprises a ToF or iToF sensor for example a time-of-flight camera or a smartphone. A time-of-flight camera may be a range imaging camera system that determines the distance of objects measuring the time-of-flight (ToF) of a light signal between the camera and the object for each point of the image.

A pixel array may comprise columns and rows of pixels. The pixels of a ToF camera typically comprise one or more photosensitive elements (e.g. photo diodes). A photosensitive element converts the incoming light into a current. Switches (e.g. transfer gates) that are connected to the photo diode may direct the current to one or more memory elements (e.g. floating diffusion) that act as accumulation elements that accumulate and/or store charge. The pixels may be lock-in pixels, e.g. a FDGS type pixels or Photonic Mixer Devices (PMD), for the time of flight camera. All pixels in the ToF/iToF sensor may be controlled by the modulation/demodulation signal which is based on a multi-level synchronized clock signal. The multi-level mixing clock scheme may be used to generate one or more (effective) modulation/demodulation signals that drive the pixels. These modulation/demodulation signals may be step functions that comprises multiple voltage levels.

For each column of pixels, a demodulation driver may be used. The demodulation driver may generate a demodulation signal based on the multi-level synchronized clock signal.

Each demodulation driver may be connected to the pixels in its corresponding column, by two routing wires. A demodulation may be transported via two routing wires. The demodulation signal that is transported through the two routing wires may have a phase shift. That phase shift may be 90 degree or 180 degree or 270 degree. The clock-gated latch may be installed between the two routing wires such that both routing wires are connected to the clock-gated latch in a-symmetrical way.

According to the embodiments the clock-gated latch improves the fall time of a demodulation signal transported by the routing wire. The fall time may be the time that it takes for the amplitude of a signal to fall from a first specified value to a second to specified value. For example, the first specified value may be 70%, 80% or 90% of the peak value of the signal. For example, the second specified value may be 30%, 20% or 10% of the peak value of the signal.

According to the embodiments the clock-gated latch is installed at the top side of the pixel column.

According to the embodiments the clock-gated latch is installed directly above a first pixel of the pixel column.

According to the embodiments the clock-gated latch is installed at the bottom side of the pixel column.

According to the embodiments the clock-gated latch is installed directly below a last pixel of the pixel column.

According to the embodiments a first clock-gated latch is installed at a top side of the pixel column and a second clock-gated latch is installed at a bottom side of the pixel column.

According to the embodiments the first clock-gated latch is installed directly above a first pixel of the pixel column and the second clock-gated latch is installed directly below a last pixel of the pixel column.

According to the embodiments the clock-gated latch comprises two inverter gates.

According to the embodiments the clock-gated latch comprises a latch enabling input. The latch enabling input may be any interface that allows an electronic signal to be input to the latch in such a way that it changes the state of the latch to enable or to disable. The input signal may be an electronic current signal or a voltage signal.

According to the embodiments a clock signal enables/disables the clock-gated latch. A clock signal may be an electronic current signal or a voltage signal. The signal may change the state of the clock-gated latch to enable or to disable. The clock signal may be a signal that oscillates between a high and a low state.

The clock signal may be a rectangular signal. The generation of a rectangular signal may be done by a quartz oscillator or by an oscillating crystal. May be several different clock signals are required. In this case may be a master oscillator is responsible for providing these different clock signals, which may be generated with the help of phase-locked loop (PLL) or a frequency divider.

According to the embodiments the clock signal is generated by a latch clock. The latch clock may be identical with the clock of the electronic device which may generate its clock signals as described above or the latch clock signal may be generate on the basis of the clock signal of the electronic device by a phase-locked loop (PLL) or a frequency divider as described above. Or the latch clock may be a separate clock device. In this case the latch, clock may generate its clock signal by quartz oscillator including the control circuit or by an oscillating crystal. The latch clock may also be implemented as a software program.

According to the embodiments the clock signal is generated on the basis of an overflow transistor gate signal. The OFG signal may be generated by the same synchronized clock which generates other signals within the iToF sensor for example the demodulation signal and therefore the delay gradient is the same. In another embodiment the OFG signal, may be generated by a separate clock for example a vertical scanner in the image sensor.

According to the embodiments the clock signal is generated by inverting the overflow transistor gate signal. The inverting may be done with the help of an inverter gate.

According to the embodiments a contact pad for a power supply of the clock-gated latch is installed in a middle part of the pixel array.

According to the embodiments a first contact pad for a power supply of the clock-gated latch is installed at a left side of the pixel array and a second contact pad for the power supply of the clock-gated latch is installed at a right side of a pixel array.

According to the embodiments the electronic device is a time of flight camera.

The embodiments described below further discloses in more detail a method, comprising controlling clock-gated latch which is located between two routing wires which transport a demodulation signal from a demodulation driver to pixels of a pixel column of a pixel array.

The embodiments described below in more detail further disclose a computer program, comprising instructions, the instructions when executed on a processor controlling a clock-gated latch which is located between two routing wires which transport a demodulation signal from a demodulation driver to pixels of a pixel column of a pixel array.

Embodiments, are now described by reference to the drawings.

FIG. 1 illustrates schematically the basic operational principle of an indirect time-of-flight (iToF) camera. The iToF camera includes an illumination unit (laser) 2, a lens 3 and, an iToF sensor 6. The iToF sensor 6 includes a time resolved pixel 7 array. The time resolved pixel 7 includes two floating diffusions FA, FB, two mixing clock guiders GA, GB, an overflow transistor, a photo diode 8 and other elements. The mixing clock guiders GA, GB are controlled by a synchronized clock with a modulation clock in the illumination unit (laser) 2. The same synchronized clock guides demodulation signals GDA and GDB (see FIG. 3) and the gate signal of the overflow transistor (OFG signal). The synchronized clock is part of a driver array (demodulation driver) as it is described in FIG. 2. The photo diode 8 generates electrons based on incident photons. The generated electrons are guided to the floating diffusion FA or to the floating diffusion FB, since complementary clocks are applied to the two mixing clock guiders GA and GB. In another embodiment the synchronized clock may be implemented, by a software program. In another embodiment the demodulation signals GDA and GDB, the LSR signal (see FIG. 8 and FIG. 9) and the gate signal may be guided by different clocks. Since there might be an offset between the different clock there may be added an electronic delay in order to compensate for this.

An object 1 is actively illuminated with a modulated light 4 at a predetermined wavelength using the dedicated illumination unit 2, for instance with some light pulses of at least one predetermined frequency generated by a timing generator (not shown in FIG. 1). The modulated light 4 is returned from the object 1. A lens 3 collects the returning light 5 and forms an image of the objects onto the iToF sensor 4 of the camera. Depending on the distance Z of objects from the camera, a delay is experienced between the emission of the modulated light 4, e.g. the so-called light pulses, and the reception at the camera of those returned light pulses 5.

Indirect time-of-flight (iToF) cameras calculate a delay between modulated light 4 and returned light 5 for obtaining depth measurements by sampling a correlation wave, e.g. between a demodulation signal generated by the timing generator and the reflected light 5 that is stored in a time resolved pixel 7.

Figure 2:
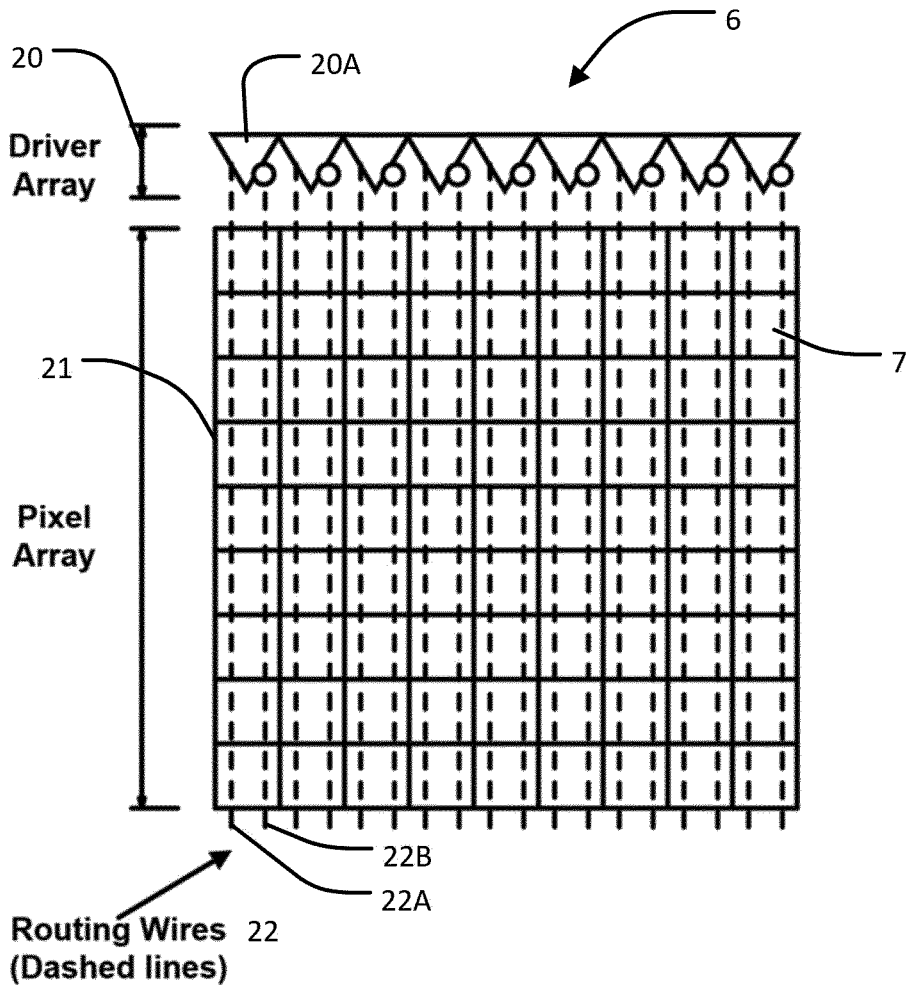
FIG. 2 schematically shows an example of the iToF sensor 6 as it may be used in the iToF camera of FIG. 1.

FIG. 2 shows a schematic example of the iToF sensor 6 as it may be used in the iToF camera of FIG. 1 The iToF sensor 6 comprises a demodulation driver array 20 which comprises one demodulation driver 20A per pixel column. Furthermore, the synchronized clock (not shown in FIG. 2) is part of the driver array. Further, the iToF sensor 6 comprises a pixel array 21, which can consist of several pixels 7 per row and per column. Further, the iToF sensor 6 comprises routing wires 22 (dashed lines) which connect the demodulation driver array 20 with pixels within the pixel array. In this embodiment the iToF sensor 6 comprises for each pixel column one demodulation driver 20A which produces modulations signals GDA and GDB (see FIG. 3) respectively which are transmitted by two respective routing wires 22A and 22B. Each demodulation driver 20A drives one column of pixels of the iToF sensor. It has to be noted that FIG. 2 does not show a complete iToF sensor but rather a simplified schematic diagram of an iToF sensor, to show the relationship of the mixing clock driver (top side triangles) and the routing wires) and pixel array.

Figure 3:
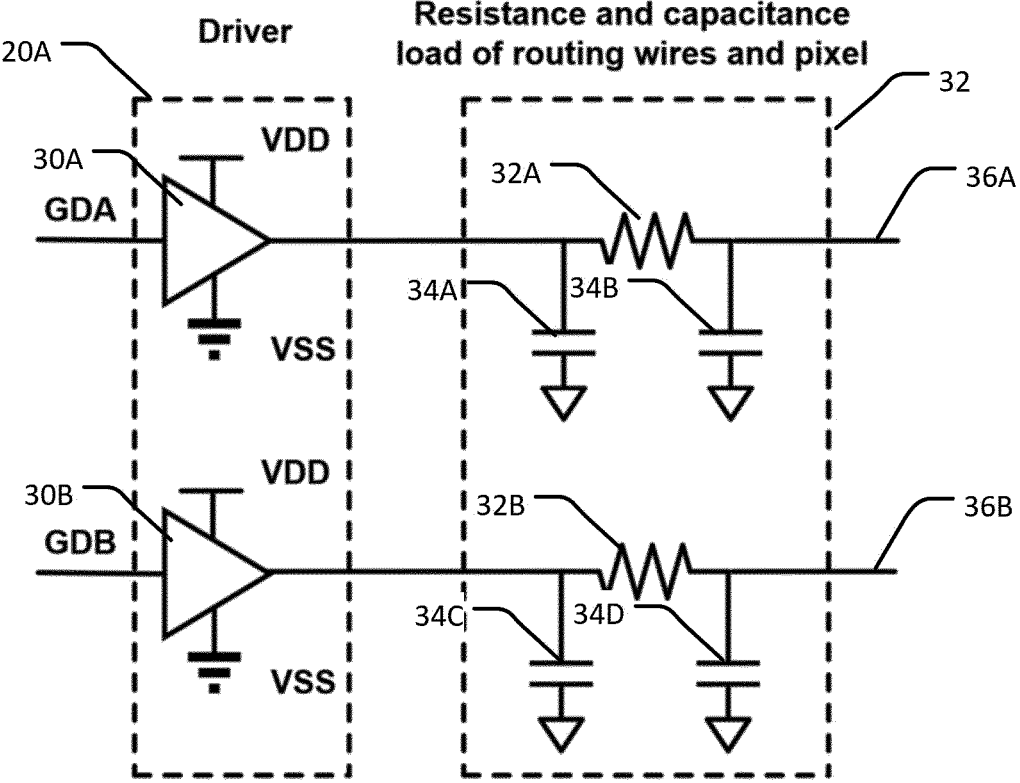
FIG. 3 schematically shows a circuit diagram of one pixel column of the iToF sensor from FIG. 2.

FIG. 3 schematically shows a circuit diagram of one pixel column of the iToF sensor from FIG. 2. Each pixel column (also sometimes just referred to as column) comprises a demodulation driver 20A which comprises two amplifiers 30A and 30B. The amplifiers 30A and 30B receive respectively the demodulation signals GDA and GDB as inputs the synchronized clock (not shown in FIG. 3). The amplifiers 30A and 30B are equipped with the positive supply voltage VDD. Furthermore, each column of the iToF sensor 6 comprises two routing wires 36A and 36B which connect all pixels 7 within the considered column with the demodulation driver 20A and thereby, the demodulation signals GDA and GDB are delivered to each pixel 7 in the considered column. Furthermore, for each pixel 7 in the considered column there is a resistance-capacitance-section 32. This resistance-capacitance-section 32 comprises along routing wire 36A two storage capacitances 34A and 34B and between the storage capacitances 34A and 34B a resistance 32A. Further, the resistance-capacitance-section 32 comprises along routing wire 36B two storage capacitances 34C and 34D and between the storage capacitances 34C and 34D a resistance 32B.

When the pixel array 21 becomes larger, for example 1 mega-pixel, several problems may arise because the demodulation drivers 20A of the driver array 20 (or the by a synchronized clock) may have difficulties to deliver proper waveforms GDA and GDB, in terms of rising time and falling time of the signals GDA and GDB and achievable voltage etc., to demodulate the lock-in pixels 7 in the iToF sensor 6. The problems may be caused by time delays (time constants) that delay the signals GDA and GDB at the pixels 7. This time delay may occur due to different possible aspects, for example because of the PCB wiring inductance (L)/resistance(R)/capacitance(C) or because of the bonding wire inductance(L)/resistance(R)/parasitic capacitance(C) or because of the demodulation driver 20A resistance (R)/parasitic capacitance(C) or because of the routing metal wire (across the pixel array) resistance (R)/capacitance(C) and load capacitance contributed by the pixel element.

In the following, the problem of a time delay because of the routing metal wire resistance (R)/capacitance(C) and load capacitance contributed by the pixel element should be addressed.

As explained above, if the pixel array is large, and many pixels are placed in one column the added resistance and capacitance becomes large and therefore the demodulation signals have a time delay (RC-filtering effect) and the demodulation driver cannot properly drive the routing wire and pixels 7 anymore. This issue could be solved by making the demodulation driver larger in terms of power, to improve the driving ability. However, this would increase the power consumption because of the demodulation driver's parasitic capacitance itself. Furthermore, the time delay of the demodulation signals GDA and GDB is almost only dominated by the routing wire resistance/capacitance and pixel capacitance at the bottom side of the pixels (see FIG. 2) and therefore making the driver's driving ability larger doesn't help to improve the signals in this case.

Clock-Gated Latch

Figure 4:
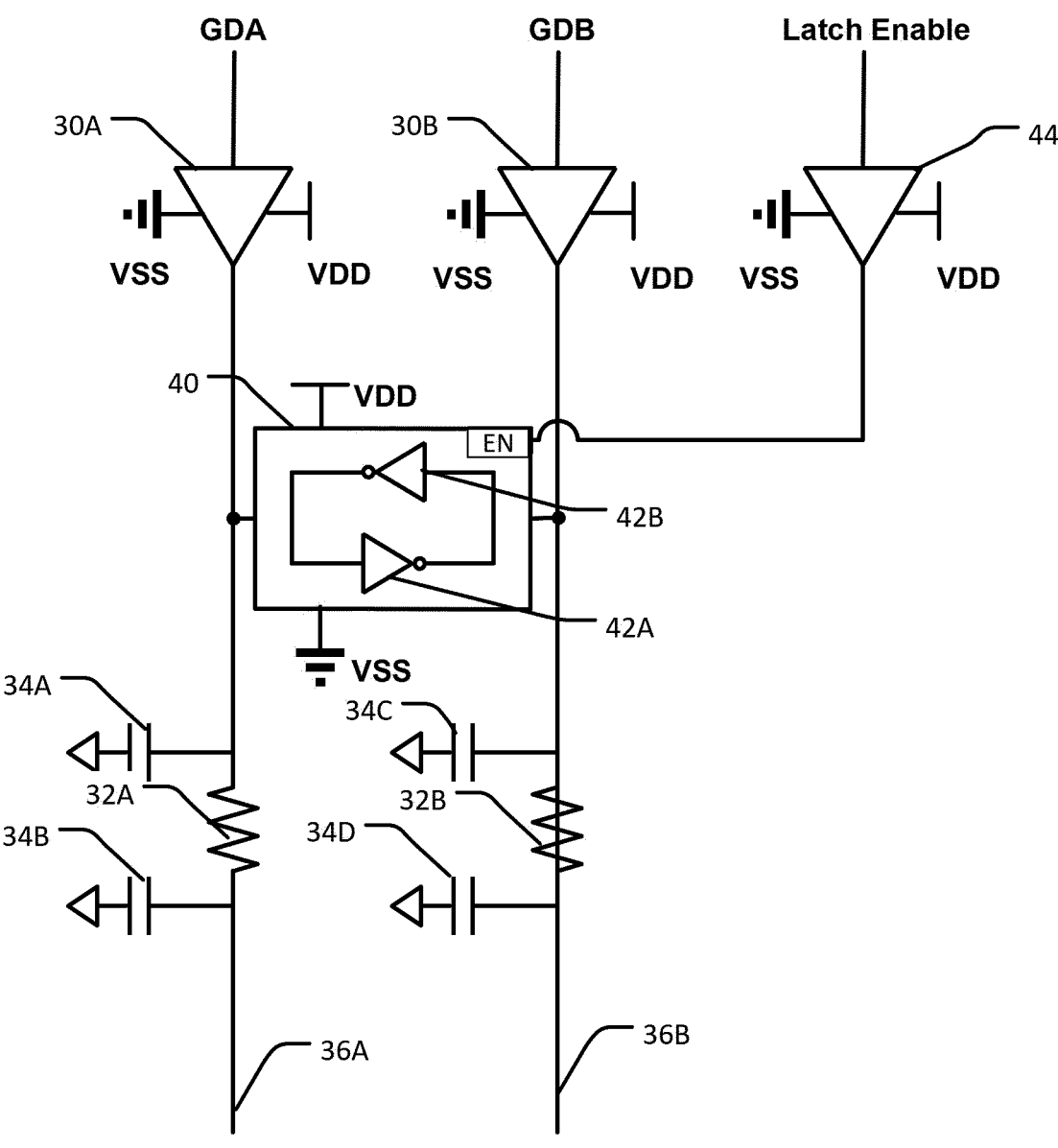
FIG. 4 schematically shows a circuit diagram of one pixel column of the iToF sensor from FIG. 2, wherein, as compared to the example of FIG. 3, a clock-gated latch is added at the top side of the pixel array.
Figure 5:
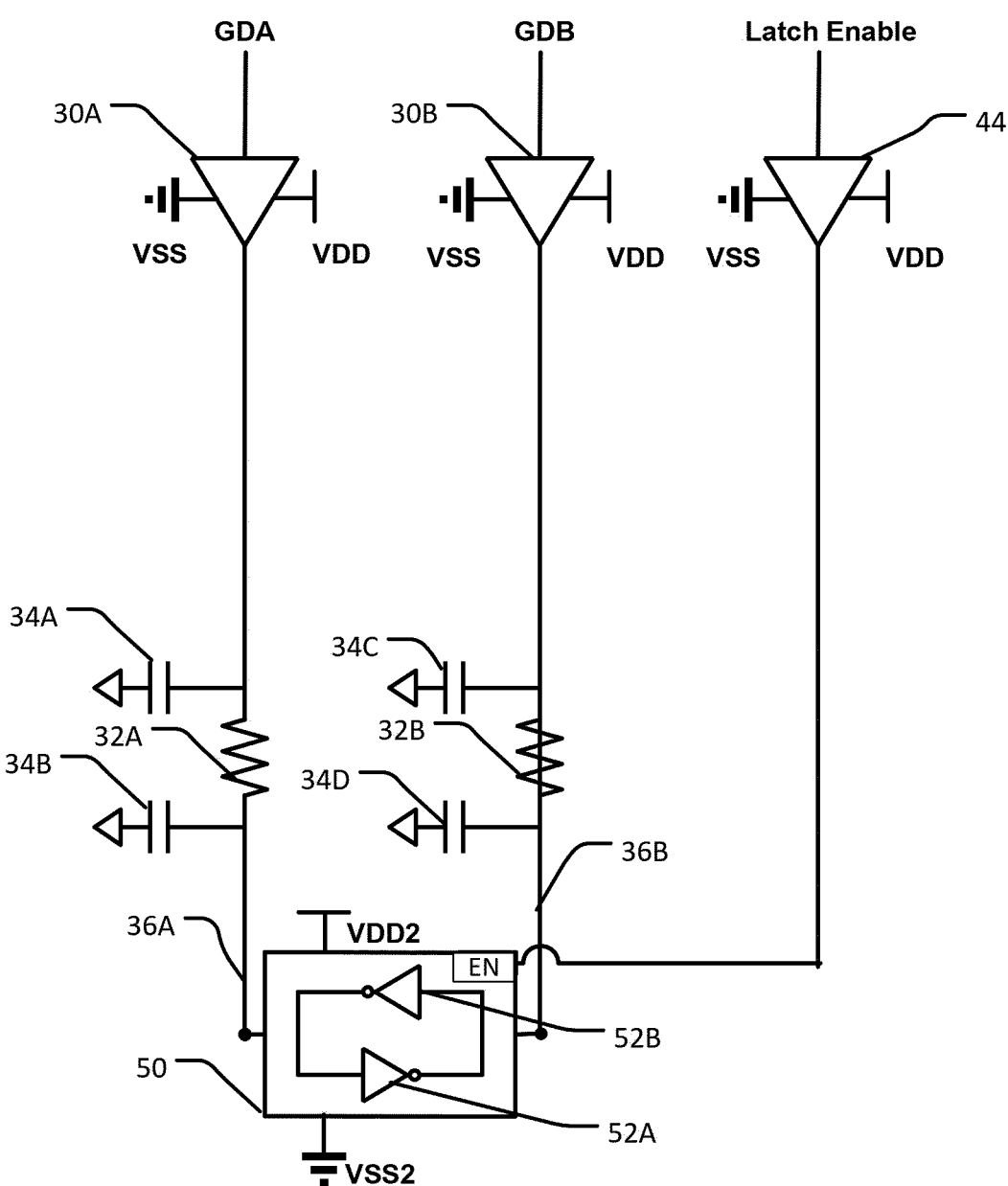
FIG. 5 schematically shows a circuit diagram of one pixel column of the iToF sensor from FIG. 2, wherein, as compared to the example of FIG. 3, a clock-gated latch is added at the bottom side of the pixel array.
Figure 6:
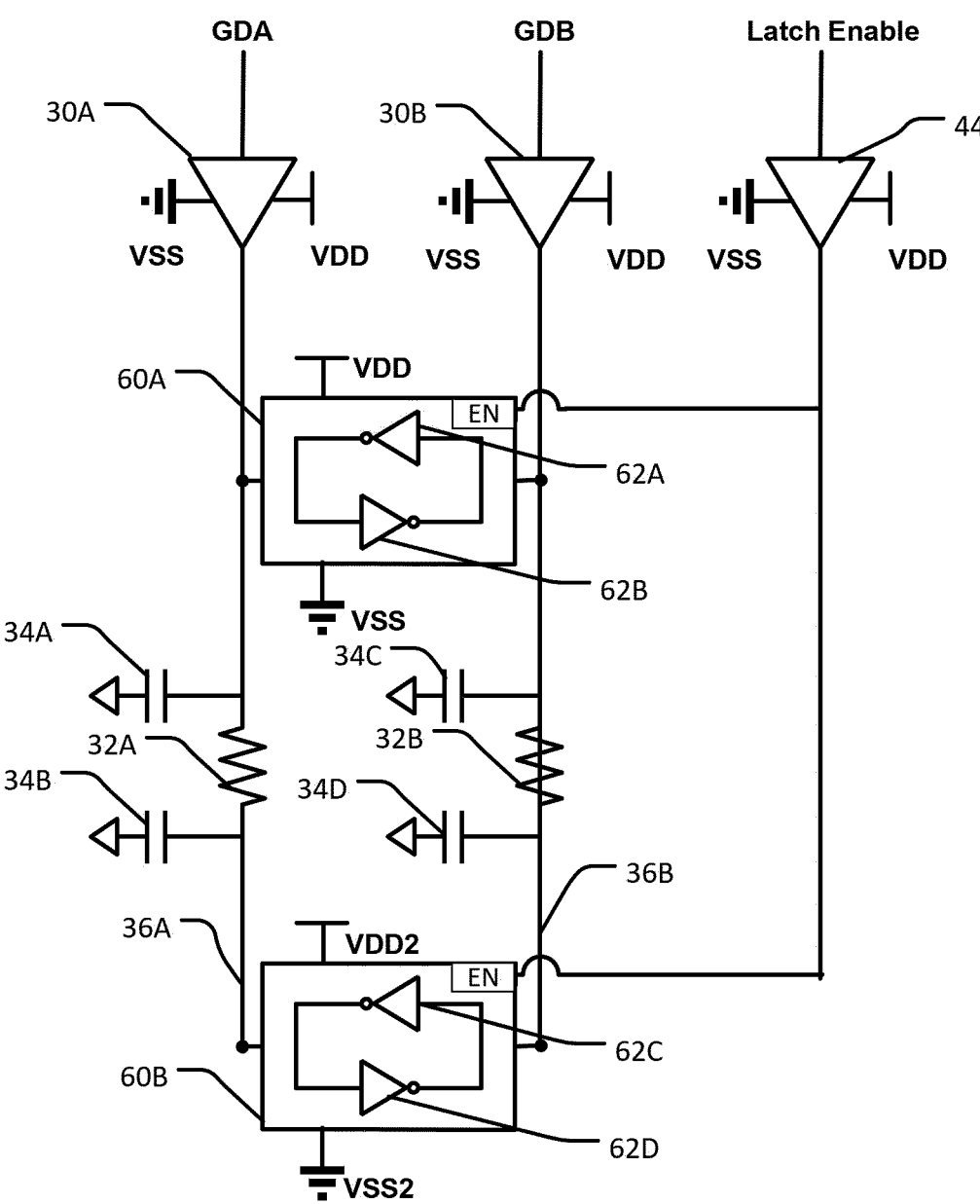
FIG. 6 schematically shows a circuit diagram of one pixel column of the iToF sensor from FIG. 2, wherein, as compared to the example of FIG. 3, a clock-gated latch is added at the top side of the pixel array and a clock-gated latch is added at the bottom side of the pixel array.

In the embodiments described below in more detail, the above addressed issue of a time delay because of the routing metal wire resistance (R)/capacitance(C) and load capacitance contributed by the pixel element is addressed by adding a clock-gated latch at the top side the pixel array (after the driver) or adding a clock-gated latch at the bottom side of the pixel array or adding a clock-gated latch at top and bottom side of the pixel array and the bottom side of the pixel array, as shown in FIG. 4, FIG. 5 and FIG. 6. A clock signal Latch Enable for enabling or disabling the latches in the embodiments of FIGS. 4, 5 and 6 is generated by a latch clock that is located at in the driver array 20. In another embodiment the latch clock may not be located in the driver array 20 but in other parts of the iToF sensor. In another embodiment the clock signal Latch Enable may be generated not by a latch clock but by another clock, for example a clock that is also used to guide other parts of the iToF sensor, for example the synchronized clock of FIG. 1 In yet another embodiment, the latch clock may be implemented by a software program.

FIG. 4 schematically shows a circuit diagram of one pixel column of the iToF sensor from FIG. 2, wherein, as compared to the example of FIG. 3, a clock-gated latch is added at the top side of the pixel array. A clock-gated latch is added at the top side of the pixel array, for example directly after the driver and above the first pixel. Each column comprises a demodulation driver which comprises two amplifiers 30A and 30B. The amplifiers 30A and 30B receive respectively the demodulation signals GDA and GDB as inputs from the synchronized clock (not shown in FIG. 4). The amplifiers 30A and 30B are equipped with the positive supply voltage VDD. Furthermore, each column of the iToF sensor 6 comprises two routing wires 36A and 36B which connect all pixels 7 within the considered column with the demodulation driver and, thereby the demodulation signals GDA and GDB are delivered to each pixel 7 in the considered column. Furthermore, each pixel 7 in the considered column comprises along the routing wire 36A two storage capacitances 34A and 34B and between the storage capacitances 34A and 34B a resistance 32A. Further, each pixel 7 in the considered column comprises along the routing wire 36B two storage capacitances 34C and 34D and between the storage capacitances 34C and 34D a resistance 32B. Furthermore, at the top side of the pixel array, in the considered pixel column, a clock-gated latch 40 is placed between routing wires 36A and 36B. Top side of the pixel array in the considered column is to be understood as relative to the considered column, that means top side means the beginning side of the considered pixel column. For example, the lock-gated latch 40 is located directly above the first, pixel element. The clock-gated latch 40 comprises two inverter gates (also called. NOT gate) 42A and 42B. The clock-gated latch 40 is connected to the routing wires 36A and 36B. Furthermore, the clock-gated latch 40 has an enable input EN, which is connected to a clock signal Latch Enable. The clock signal Latch Enable is amplified by an amplifier 44 which is equipped with the positive supply voltage VDD. Further, the clock-gated latch is equipped with the positive supply voltage VDD.

In another embodiment the clock-gated latch can be placed at the in the upper half of the considered column of the pixel array. In yet another embodiment the clock-gated latch can be placed outside of the considered column of pixel array, but it can be connected to the pixels in the considered column in such a way that it is connected to the topmost pixel in the considered column first.

The inverter gates 42A and 42B are logical gates. An inverter gate outputs a voltage representing the opposite logic-level to its input. That means its main function is to invert the input signal which is applied, that is if the applied input is low then the output becomes high and vice versa. The logical inverter gates can be implemented as an electronic circuit, in different ways. For example, they can be constructed using a single NMOS transistor or a single PMOS transistor coupled with a resistor. Alternatively, inverters can be implemented using two complementary transistors in a CMOS configuration. Yet another alternative would be to implement the inverter logic with bipolar junction transistors in either a resistor—transistor logic or a transistor—transistor logic configuration.

The clock signal Latch Enable, if turned off, achieves that the clock enabled latch does not accept any input signals that could change the output, or in other words the latch is turned off. This inclusion of the clock, signal Latch Enable is applied because of the complementary nature of the latch. If the demodulation signals GDA and GDB are set both to one or both to zero at the same time for a longer, period of time, a big current would be observed. To avoid this issue, the clock signal Latch Enable is set to zero outside of an integration time period (mixing period) and an additional pre-mix and post-mix time period (see FIG. 8) to let the including the control circuit signal Latch Enable toggle properly.

FIG. 5 schematically shows a circuit diagram of one pixel column of the iToF sensor from FIG. 2, wherein, as compared to the example of FIG. 3, a clock-gated latch is added at the bottom side of the pixel array. Each column comprises a demodulation driver which comprises two amplifiers 30A and 30B. The amplifiers 30A and 30B receive respectively the demodulation signals GDA and GDB as inputs from the synchronized clock (not shown in FIG. 5). The amplifiers 30A and 30B are equipped with the positive supply voltage VDD. Furthermore, each column of the iToF sensor 6 comprises two routing wires 36A and 36B which connect all pixels 7 within the considered column with the demodulation driver and thereby, the demodulation signals GDA and GDB are delivered to each pixel 7 in the considered column. Furthermore, each, pixel 7 in the considered column comprises along the routing wire 36A two storage capacitances 34A and 34B and between the storage capacitances 34A and 34B a resistance 32A. Further, each pixel 7 in the considered column comprises along the routing wire 36B two storage capacitances 34C and 34D and between the storage capacitances 34C and 34D a resistance 32B. Furthermore, at the bottom side of the pixel array, in the considered pixel column a clock-gated latch 50 is placed between routing wires 36A and 36B. Bottom side of the pixel array in the considered column is to be understood as relative to the considered column, that means bottom side means the ending side of the considered pixel column. For example, the lock-gated latch 50 is located directly below the last pixel element. The clock-gated latch 50 comprises two inverter gates (also called NOT gate) 52A and 52B. The clock-gated latch 50 is connected to the routing wires 36A and 36B. Furthermore, the clock-gated latch 50 has an enable input EN, which is connected to a latch enabling clock signal Latch Enable. The clock signal Latch Enable is amplified by an amplifier 44 which is equipped with the positive supply voltage VDD. Further, the clock-gated latch is equipped with the positive supply voltage VDD2. The contact pad which connects the latch to the power supply VDD2 is installed at the bottom side of the pixel array. This is possible because the latch is self-triggered (effectively another pair of clock and mixing driver section is arranged the bottom side of the pixel array without mix clock delay mismatch issue).

In another embodiment the clock-gated latch can be placed at the in the lower half of the considered column of the pixel array. In yet another embodiment the clock-gated latch can be placed outside of the considered column of pixel array, but it can be connected to the pixels in the considered column in such a way that it is connected to the bottommost pixel in the considered column first.

Because of added power pads on the other side of the pixel array, the clock-gated latches can draw current from the newly added power pads instead of only from, power pads of the demodulation drivers. So, if we consider the RC time constant, instead of routing wire resistance R only from the top side, we have two parallel effective routing resistances from both sides, which has a smaller effective resistance than from only one side. Therefore, the inclusion of the clock-gated latch into the columns of the iToF sensor as described above can help to break the RC time constant. Besides, owing to the positive feedback loop existing in the latch circuits, the latch circuits can promote the toggling speed of a complementary clock, i.e. GDA/GDB. Therefore, the demodulator signal of the iToF sensor has a faster rising/falling time. In other words in this case, where the clock-gated latch is placed at the bottom side of the pixel array due to the added power supply (voltage VDD2), which is delivered by power pads (i.e. the IO pins sitting around the chip core to provide an interface to the outside of the chip by e.g. bonding wires), the RC time constant of the bottom pixels is not limited by the path from the top driver (and the big resistance and capacitance due to the long distance) but instead the RC time constant is reduced by the bottom placed clock-gated latch and the added bottom side power supply. Therefore, the overall RC time constant is reduced. Further, the current flowing from, the bottom power supply is much smaller than the current from the top side. Therefore, only a small number of power pads are needed at the bottom side (see also FIG. 12 and FIG. 13). Therefore, the clock-gated latch can help to break the RC time constant for all pixel within the pixel column where the clock-gated latch is placed, especially for pixels at the bottom side of the pixel array. Therefore, the demodulator signal of the iToF sensor has a faster rising/falling time.

FIG. 6 schematically shows a circuit diagram of one pixel column of the iToF sensor from FIG. 2, wherein, as compared to the example of FIG. 3, a clock-gated latch is added at the top side of the pixel array and a clock-gated latch is added at the bottom side of the pixel array. Each column comprises, a demodulation driver which comprises two amplifiers 30A and 30B. The amplifiers 30A and 30B receive respectively the demodulation signals GDA and GDB as inputs from the synchronized clock (not shown in FIG. 6). The amplifiers 30A and 30B are equipped with the positive supply voltage VDD. Furthermore, each column of the iToF sensor 6 comprises two routing wires 36A and 36B which connect all pixels 7 within the considered column with the demodulation driver and thereby, the demodulation signals GDA and GDB are delivered to each pixel 7 in the considered column. Furthermore, each pixel 7 in the considered column comprises along the routing wire 36A two storage capacitances 34A and 34B and between the storage capacitances 34A and 34B a resistance 32A. Further, each pixel 7 in the considered column comprises along the routing wire 36B two storage capacitances 34C and 34D and between the storage capacitances 34C and 34D a resistance 32B. Furthermore, at the top side of the pixel array, in the considered pixel column, a clock-gated latch 60A is placed between routing wires 36A and 36B. Top side of the pixel array in the considered column is to be understood as relative to the considered column, that means top side means the beginning side of the considered pixel column. For example, the lock-gated latch 60A is located directly above the first pixel element. The clock-gated latch 60A comprises two inverter gates (also called NOT gate) 62A and 62B. The clock-gated latch 60A is connected to the routing wires 36A and 36B. Furthermore, the clock-gated latch 60A has an enable input EN, which is connected to a latch enabling clock signal Latch Enable. The clock signal Latch Enable is amplified by an amplifier 44 which is equipped with the positive supply voltage VDD. Further, the clock-gated latch 60A is equipped with the positive supply voltage VDD. Furthermore, at bottom side of the pixel array in the considered pixel column, a clock-gated latch 60B is placed between routing wires 36A and 36B. Bottom side of the pixel array in the considered column is to be understood as relative to the considered column, that means bottom side means the ending side of the considered pixel column. For example, the lock-gated latch 60B is located directly below the last pixel element. The clock-gated latch 60B comprises two inverter gates (also called NOT gate) 62C and 62D. The clock-gated latch 60B is connected to the routing wires 36A and 36B. Furthermore, the clock-gated latch 60B has an enable input EN, which is connected to a latch enabling clock signal Latch Enable. The clock signal Latch Enable is amplified by an amplifier 44 which is equipped with the positive supply voltage VDD. Further, the clock-gated latch is equipped with the positive supply voltage VDD2.

In another embodiment the clock-gated latch 60A can be placed at the in the upper half of the considered column of the pixel array. In yet another embodiment the clock-gated latch 60A can be placed outside of the considered column of pixel array, but it can be connected to the pixels in the considered column in such a way that it is connected to the topmost pixel in the considered column first.

In another embodiment the clock-gated latch 60B can be placed at the in the lower half of the considered column of the pixel array. In yet another embodiment the clock-gated latch 60B can be placed outside of the considered column of, pixel array, but it can be connected to the pixels in the considered column in such a way that it is connected to the bottommost pixel in the considered column first.

In this case, where one clock-gated latch is placed at the bottom side of the pixel array and one clock-gated latch is placed at the top side of the pixel array the RC time constant of all pixels is reduced. Therefore, the demodulator signal of the iToF sensor has a faster rising/falling time. Further, the current flowing from the bottom power supply is much smaller than the current from the top side of the pixel array. Therefore, only a small number of power pads are needed at the bottom side of the pixel array (see also FIG. 12 and FIG. 13).

In the embodiments described above, two latches are used per pixel column. In alternative embodiments, it is also possible to implement more latches than only two per column. For example, in the middle of each row a third latch could be installed. The clock-gated latches in this setup are used in the analog domain to adjust the driving ability directly and the clock-gated latches are not used as register.

Figure 7:
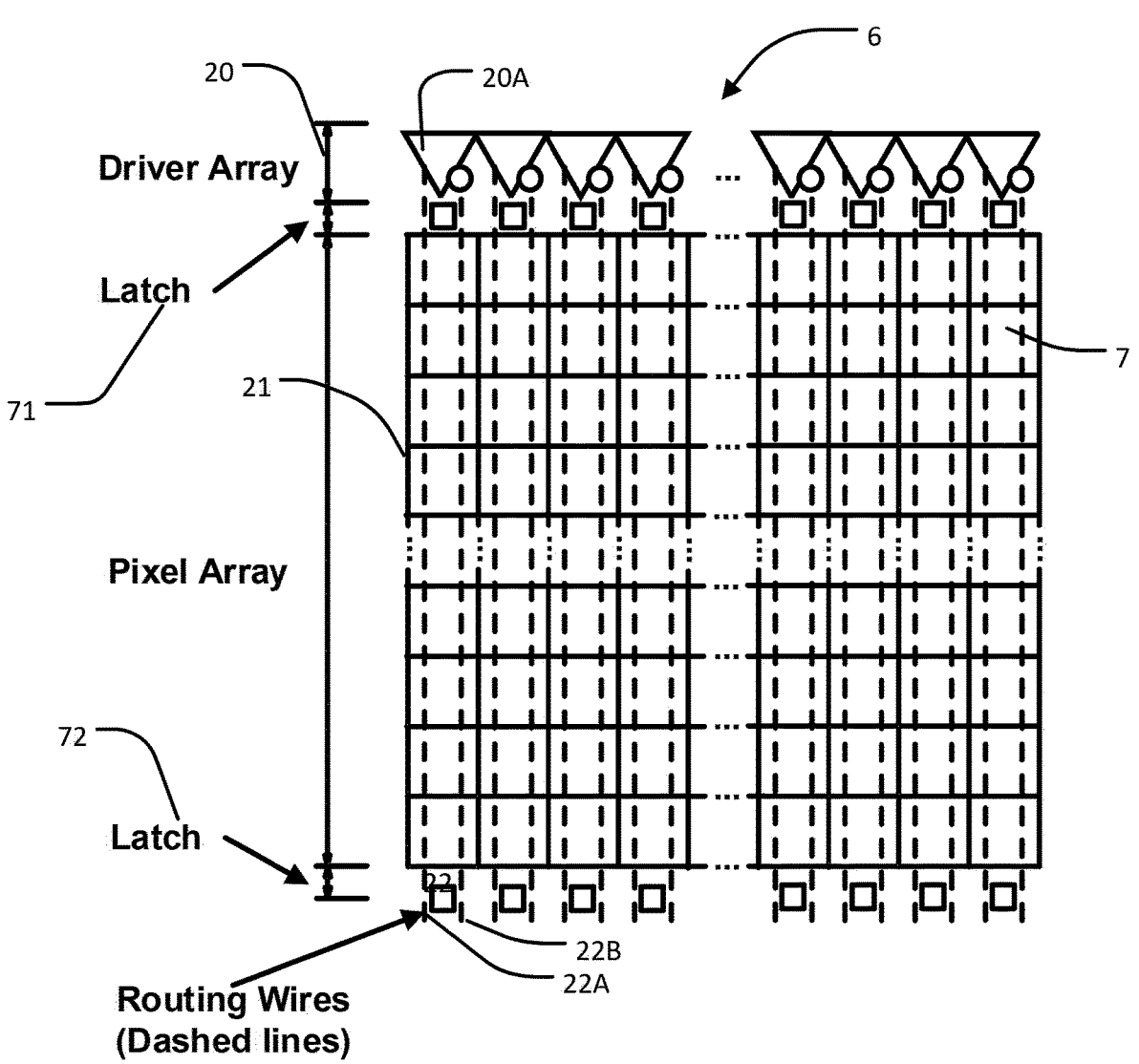
FIG. 7 schematically shows an example of the iToF sensor 6 as it may be used in the iToF camera of FIG. 1; as compared to the example of FIG. 2, clock-gated latches are added, at the top side of the pixel array and a clock-gated latches are added at the bottom side of the pixel array.

FIG. 7 shows schematically an example of the iToF sensor 6 as it may be used in the iToF camera of FIG. 1; as compared to the example of FIG. 2, clock-gated latches are added at the top side of the pixel array and clock-gated latches are added at the bottom side of the pixel array. A row of latches 71 is added at the top side of the pixel array. A row of latches 72 is added at the bottom side of the pixel array. In this embodiment there is one latch at the top and one latch at the bottom for each column of the pixel array. In this embodiment the row of latches 71 is installed above the first rows of pixels and the row of latches 72 is installed below the last rows of pixels. In another embodiment the row of latches 71 may installed in the upper half of the pixel array 21 and, the row of latches 72 may be installed in the lower half of the pixel array 21. A row of latches that is added at the top side of the pixel array is to be understood as relative to the pixel array, that means top means the beginning side of the pixel array, that is above the first row. A row of latches that is added at the bottom side of the pixel array is to be understood as relative to the pixel array, that means bottom means the ending side of the pixel array, that is below the last, row.

Figure 8:
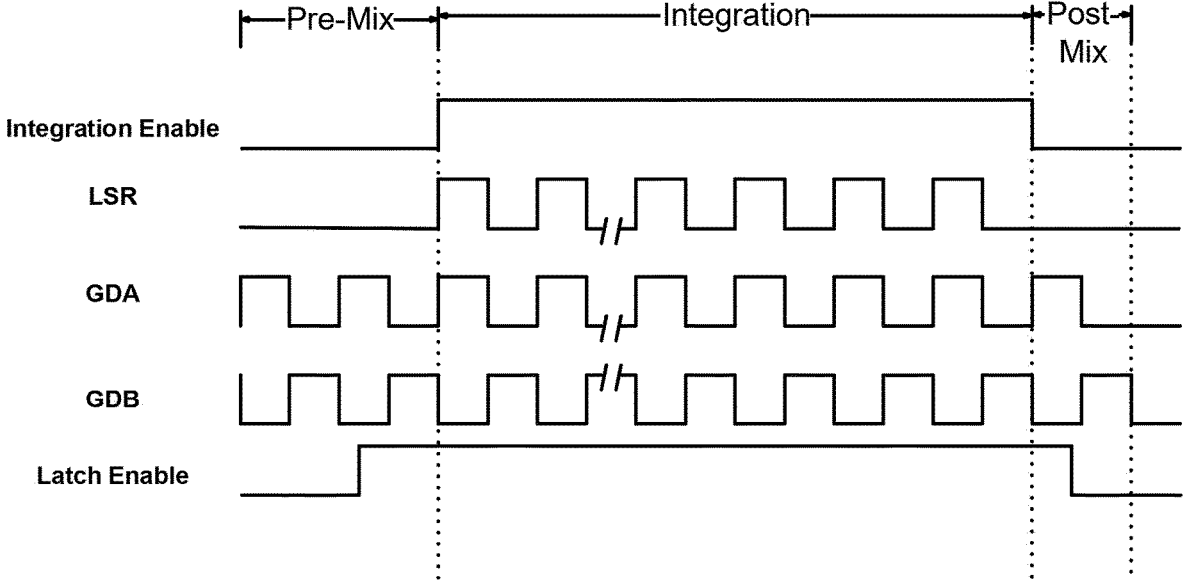
FIG. 8 schematically shows a timing diagram for signals transmitted within the iToF sensor from FIG. 2.

FIG. 8 schematically shows a timing diagram for signals transmitted within the iToF sensor from FIG. 2. According to this timing diagram, the synchronized clock and the latch clock may control the timing of the respective signals. An Integration time period or mixing period is the time period where the photons that are sent out from the laser 2 of the iToF camera are received and accumulated (also integrated or mixed together) by each pixel 7 of the iToF sensor 6 to calculate a correlation signal in order to measure the distance of an object. Before the integration time period a Pre-Mix time period is defined and after the integration time period a Post-Mix time period is defined. An Integration Enable signal is a signal that defines the integration time of the iToF camera, i.e. the time period during which the iToF camera performs integration of the arriving photons sent out by the laser 2. Therefore, the Integration Enable signal is set to one during the Integration time period and set to zero otherwise. An LSR signal is a laser signal that is sent out by the laser 2 of the iToF camera, for example the modulated light 4 with a predetermined wavelength (see FIG. 1). The LSR signal can be a square wave signal with a predetermined wavelength 1 or another periodic or aperiodic signal with a different wavelength. The LSR signal is set to zero outside of the Integration time period. The demodulation signal GDA produced by synchronized clock and has the same phase and wavelength 1 as the laser signal LSR. The demodulation signal GDA does not vanish during Pre-Mix and Post-Mix time period. The demodulation signal GDB produced by the mixing clock GB has a phase difference of 180° to the LSR signal and the same wavelength 1 as the laser signal LSR. The demodulation signal GDB does not vanish during Pre-Mix and Post-Mix time period. The clock signal Latch Enable that turns on/off the clock-gated latches 40, 50 and 60 described above (see FIG. 4, FIG. 5 and FIG. 6). The clock signal Latch Enable is set to one (turned on) during Integration time period and also for some time before, for example one and a half wavelength 1 before, i.e. during Pre-Mix period, and for some time afterwards, for example one wavelength 1 afterwards, i.e. Post-Mix period and otherwise the clock signal Latch Enable is set to zero. This means, GDA and GDB start before and respectively end after the LSR signal. When the clock signal Latch Enable is set zero, the clock enabled latches 40, 50 and 60 do not accept any input signals that could change the output, or in other words the latch is turned off. The clock signal Latch Enable is applied because of the complementary nature of the latches 40, 50 and 60. That means if the demodulation signals GDA and GDB are set both to one or both are set to zero at the same time for a longer period of time a big current would be observed. To avoid this issue, the clock signal Latch Enable is set to zero outside of an integration time period and parts of the Pre-Mix and Post-Mix period to let the clock signal Latch Enable toggle properly.

Reuse of OFG Signal

In an iToF sensor different signals are generated and used to operate the sensor. In this embodiment a gate signal of an overflow transistor ("OFG signal") is reused in order to generate a clock signal for the enabling of the clock-gated latch.

Figure 9:
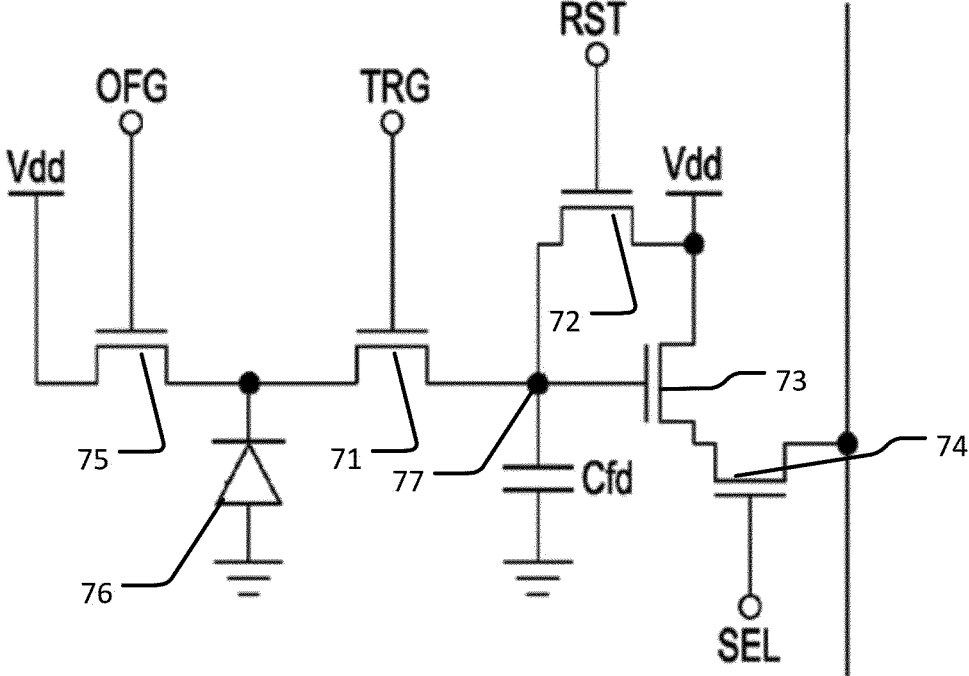
FIG. 9 shows a circuit diagram illustrating the circuit configuration of a pixel structure of a pixel.

FIG. 9 shows a circuit diagram illustrating the circuit configuration of a pixel structure of a pixel. The pixel for example, includes a transfer transistor 71, a reset transistor 72, an amplifying transistor 73, a select transistor 74 and an overflow transistor (also called charge discharging transistor) 75, in addition to a photodiode 76 which is a photoelectric conversion unit. The photodiode 76 has an anode electrode connected to a negative power source (e.g., ground), photoelectrically converts received visible rays into photoelectric charges whose amount is proportional to the light amount thereof and accumulates the photoelectric charges. The photodiode 76 has a cathode electrode electrically connected to a gate electrode of the amplifying transistor 73 via the transfer transistor 71. A node 77 electrically connected to the gate electrode of the amplifying transistor 73 will be referred to as an FD (Floating Diffusion) section.

The overflow transistor 75 is connected between the photodiode 76 and a charge discharging node (e.g., the power line of the supply voltage Vdd). The overflow transistor 75 is turned on when a gate signal of the overflow transistor OFG is supplied to a gate electrode thereof, so that the photoelectric charges in the photodiode 76 are selectively discarded to the overflow node.

The overflow transistor 75 is turned on during the period for which the accumulation of photoelectric charges is not performed, which is sometimes called anti-bloom mode. Thereby over exposure in an image due to charge overflow within a pixel element should be prevented, that means it is prevented that excessive light is incident into the photodiode 76 and saturated with photoelectric charges, and then charges exceeding the saturation charge amount overflow the FD section 77 or the periphery thereof. By reusing the gate signal of the overflow transistor, the OFG signal, as clock signal for the enabling of the clock-gated latch instead of installing a new clock and signal lines, additional signal pins can be saved. The OFG signal may be generated by the same synchronized clock which generates the demodulation signal and therefore the delay gradient is the same. In another embodiment the OFG signal may be generated by a separate clock for example a vertical scanner in the image sensor.

Figure 10:
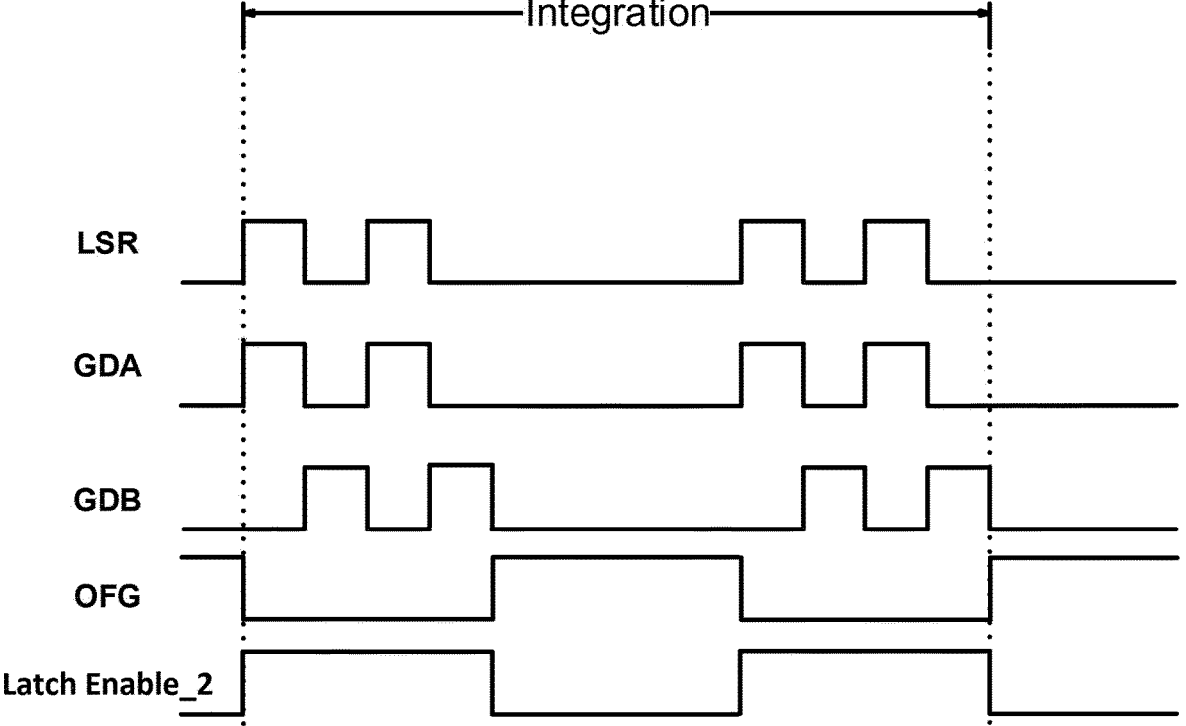
FIG. 10 illustrates schematically a timing diagram for signals transmitted within the iToF sensor from FIG. 2, wherein a clock signal for a clock-gated latch is generated by reusing the gate signal of an overflow transistor (OFG) of an iToF sensor.

FIG. 10 illustrates schematically a timing diagram for signals transmitted within the iToF sensor from FIG. 2, wherein a clock signal for a clock-gated latch is generated by reusing the gate signal of an overflow transistor (OFG) of an iToF sensor. According to this timing diagram, a timing generator may control the timing of the respective signals. An Integration time period or mixing period is the time period where the photons that are sent out from the laser 2 of the iToF camera are received and accumulated (also integrated or mixed together) by the iToF sensor 6 to calculate a correlation signal in order to measure the distance of an object. An LSR signal is a laser signal that is sent out by the laser 2 of the iToF camera, for example the modulated light 4 with a predetermined wavelength (see FIG. 1). The LSR signal can be a square wave signal with a predetermined wavelength 1, or another periodic or aperiodic signal with a different wavelength. The LSR signal is set to zero outside of the Integration time period. The demodulation signal GDA produced by the synchronized clock (see description of FIG. 3) has the same phase and wavelength 1 as the laser signal LSR. The demodulation signal GDB produced by the mixing clock GB (see FIG. 3) has a phase difference of 180° to the LSR signal and the same wavelength 1 as the laser signal LSR. An OFG signal is the signal which controls the gate of an overflow transistor. A clock signal Latch Enable_2 is the clock signal that turns on/off the clock-gated latches 40, 50, 60 or 91 (see FIG. 11). The clock signal Latch Enable_2 is set to one (turned on) when either the demodulation signal GDA or GDB is non-zero and the clock signal Latch Enable_2 is set to zero when the demodulation signal GDA and GDA are both zero. That means the clock signal Latch Enable_2 is exactly the inverted OFG signal. Therefore, the clock signal Latch Enable_2 can be generated by inverting the OFG signal and thereby reusing the OFG signal. To invert the OFG signal for example an inverter gate or a non-overlapping clock generator or other circuits can be used, which is explained below in FIG. 9.

Figure 11:
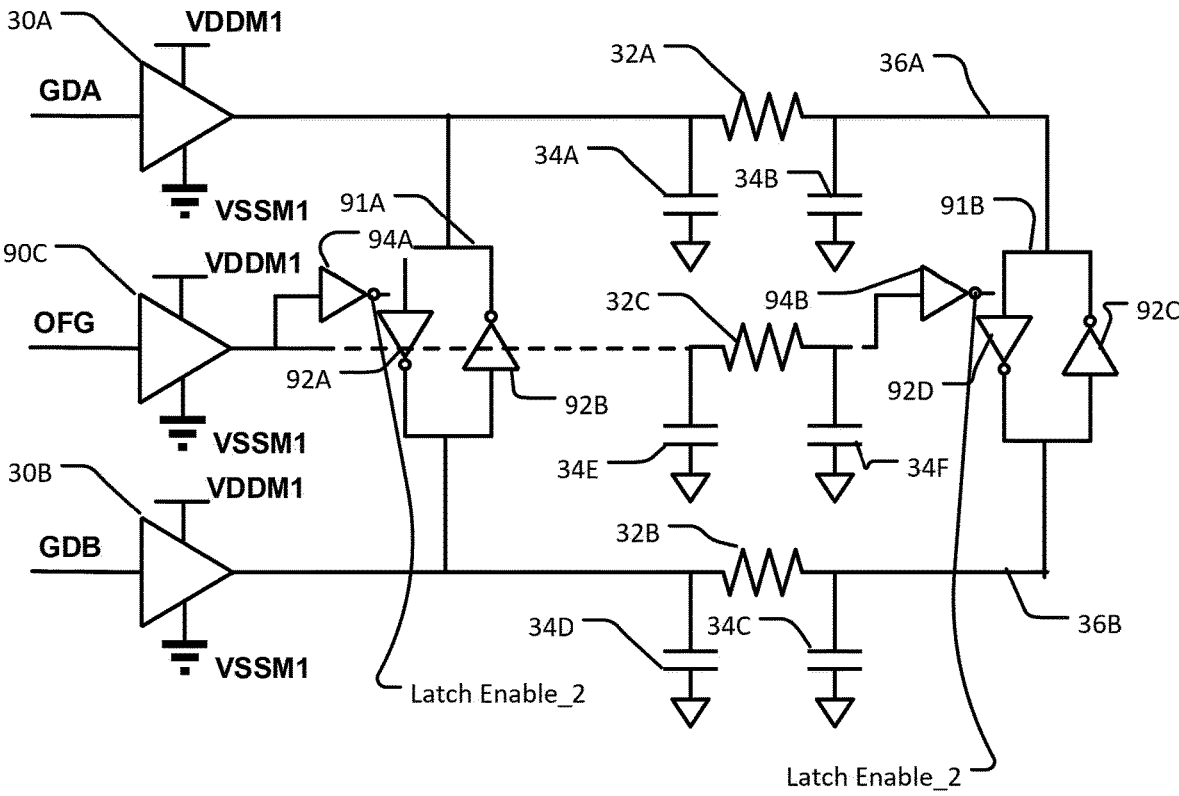
FIG. 11 illustrates one column of the iToF sensor from FIG. 2, with a clock-gated latch at the top side of the pixel array and a clock-gated latch at the bottom side of the pixel array, wherein the latch signal is generated by reusing the OFG signal.

FIG. 11 illustrates one column of the iToF sensor from FIG. 2, with a clock-gated latch at the top side of the pixel array and a clock-gated latch at the bottom side of the pixel array, wherein the latch signal is generated by reusing the OFG signal. Each column comprises a demodulation driver which comprises two amplifiers 30A and 30B. The amplifiers 30A and 30B receive respectively the demodulation signals GDA and GDB as inputs from the synchronized clock (not shown in FIG. 11). The amplifiers 30A and 30B are equipped with the positive supply voltage VDD. Furthermore, each column of the iToF sensor 6 comprises two routing wires 36A and 36B which connect all pixels 7 within the considered column with the demodulation driver and thereby, the demodulation signals GDA and GDB are delivered to each pixel 7 in the considered column. Furthermore, each pixel 7 in the considered column comprises along routing wire 36A two storage capacitances 94A and 94B and between the storage capacitances 94A and 94B a resistance 92A. Further, each pixel 7 in the considered column comprises along routing wire 36B two storage capacitances 94C and 94D and between the storage capacitances 94C and 94D a resistance 92B. Furthermore, at the top of the pixel array directly below the amplifiers 90A/90B, in the considered pixel column, a clock-gated latch 91A is placed between routing wires 36A and 36B. The clock-gated latch 91A comprises two inverter gates (also called NOT gate) 92A and 92B. The clock-gated latch 91A is connected to the routing wires 36A and 36B. Furthermore, the clock-gated latch 91A has an enable input. Furthermore, at bottom side if the pixel array directly below the last pixel element, in the considered pixel column, a clock-gated latch 91B is placed between routing wires 36A and 36B. The clock-gated latch 91B comprises two inverter gates (also called NOT gate) 92C and 92D. The clock-gated latch 91B is connected to the routing wires 36A and 36B. Furthermore, the clock-gated latch 91B has an enable input. Furthermore, an OFG signal is amplified by the amplifier 90C and the amplified OFG signal is inverted by the inverter gate 94A. The output of the inverter gate 94A is a clock signal Latch Enable_2 which is input into the latch enable input (not shown in FIG. 11) of latch 91A to enable the latch 91A. Furthermore, the amplified OFG signal is also connected to an inverter gate 94B through a resistance 92C and two capacitances 34E and 34F. The output of the inverter gate 94B is the latch enable signal Latch Enable_2 which is input (not shown in FIG. 11) into the latch enable input of latch the latch 91B to enable the latch 91B.

Contact Pads Arrangement

Contact pads are designated surface areas on the iToF chip where the components are for example electrically connected to the power supply. Possibilities to electrically connect the pads include among others soldering and wire-bonding.

If clock-gated latches are included into the pixels as described above, especially if the clock-gated latches are installed at the bottom side of the pixel array, additional power supply is needed for the latches and therefore additional contact pads are needed. As can be seen in FIG. 2 there may be a large number of columns in an iToF sensor 6, for example if the iToF sensor has 1 million pixels (1 mega-pixel) there may be 1000 columns and 1000 rows and therefore a large number of clock-gated latches may be used in this pixel array. Therefore, new pads need to be installed and there are different possible arrangements of the contact pads at the iToF sensor 6. Alternatively, contact pads are already installed and there are different possible arrangements how to use which of the already installed contact pads. Because the pad size is much smaller than the size of the pixel array one has to find a way to how to fan-out.

Figure 12:
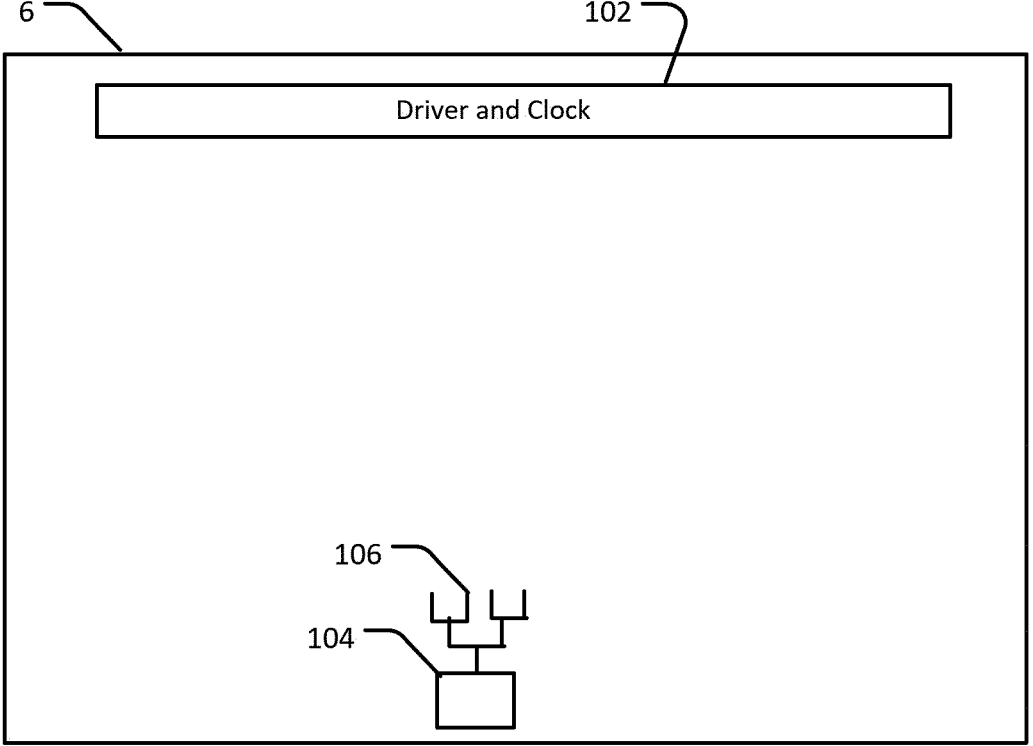
FIG. 12 shows an arrangement of a contact pad and a connection for the clock-gated latches in a binary tree structure.

FIG. 12 shows the arrangement of a contact pad and a connection for the clock-gated latches in a binary tree structure. The iToF sensor 6 includes a Driver and Clock section 102 which includes the clocks and drivers for all pixels of the iToF sensor 6. The contact pad 104 is arranged at the bottom of the pixel array in a middle part of the pixel array. A middle part of the pixel array can mean that the contact pad can be in the middle part of the pixel array, along the horizontal axes, that means for example in the middle third of the pixel array length in horizontal axes. For example, if the pixel array has 1000 columns and 1000 rows the contact pad could be arrange below the $1000^{th}$ row and between column 500 and 501. The contact pad 104 is connected to the power supply. Due to this arrangement and the binary tree layout for the power metal routing lines the gradient caused by the single pads is reduced. Furthermore, the contact pad connects the power supply to the latches in each row of the pixel array via a binary tree structure 106. The binary tree structure may be realized by an electrically conductive material like copper. If one contact pad in the middle of the pixel array which is connected to the power supply is not strong enough to cancel the horizontal gradient one or more additional contact pads can be added, so that the space in between the contact pads is equally large. For example, when two contact pads are installed one can be installed after one third of the length of the pixel array in horizontal direction and a second contact pad can be installed after two thirds of the length of the pixel array in horizontal direction. Alternatively, in another embodiment there are already contact pads installed and it has to be decided which of the already installed contact pads should be used. In this case the installed pads could form a line along the pixel array or along parts of the pixel array. In this case, a contact pad which, is in the middle part of the contact pad line along the pixel array could be used to supply the clock-gated latches with power in binary tree structure as explained above. The middle part of the contact pad line along the pixel array may for example be in the middle third of the line of contact pads along the pixel array. As explained above, more contact pads could of the line of contact pads along the pixel array may be used and connected to the clock-gated latches in a binary tree structure if one contact pad in the middle of the contact pad line along the pixel array is not strong enough to cancel the horizontal gradient.

Figure 13:
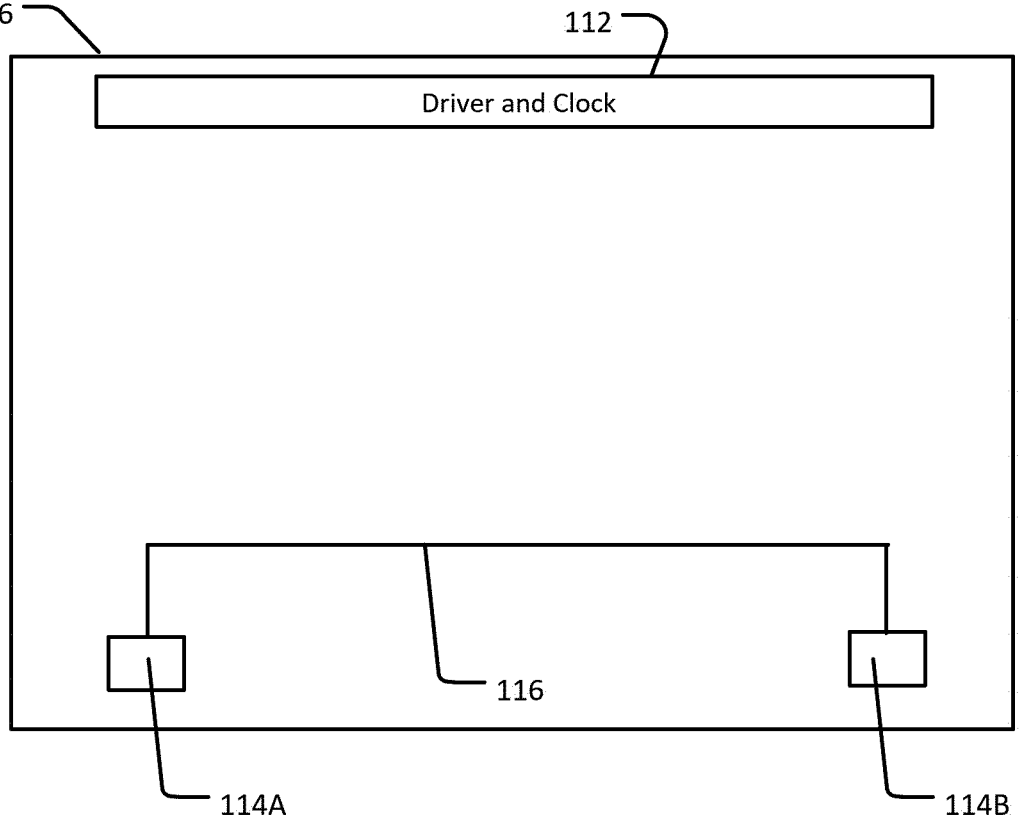
FIG. 13 shows an arrangement of contact pads and a connection for the clock-gated latches in a bilateral structure.

FIG. 13 shows the arrangement of a contact pad and a connection for the clock-gated latches in a bilateral structure. The iToF sensor 6 includes a Driver and Clock section 112 which includes the clocks and drivers for all pixels of the iToF sensor 6. The contact pad 114A is arranged at the bottom of the pixel array and at the left side of the pixel array. Both contact pads 114A and 114B are connected to the power supply. Furthermore, the contact pads 114A and 114B connect the power supply to the latches in each row of the pixel array via an electrically conductive wire 116. The power supply should be strong enough to cancel the horizontal gradient. Another possibility would be to put only one pad on the left side or only one pad on the right side of the pixel array. If there is one contact pad on each side or just one pad on one side the routing has to be strong enough, or resistance small enough, to avoid fan-out gradient. Alternatively, in another embodiment there are already contact pads installed and it has to be decided which of the already installed contact pads should be used. In this case the installed pads could form a line along the pixel array. In this case, either a contact pad which is in the on the left side of line of contact pads or a contact pad that is on the right side of line of contact pads or one contact pad on the left side of line of contact pads and one contact pad on the right side of the line of contact pads could be used to supply the clock-gated latches with power, as explained above.

Simulation Results

Table 1-4 d show different fall times tf simulation results of the demodulation signals GDA or GDB of an iToF sensor with clock-gated latches (Table 3 and 4) and without clock-gated latches (Table 1 and 2). The fall time (pulse decay time) tf is the time that it takes for the amplitude of a signal to fall from a specified value, which is 80% of the peak value in our simulation, to another specified value, which is 20% of the maximum value in our simulation. The simulations were performed with a clock signal frequency of 200 MHz. Furthermore, the simulation was performed for different corners of the CMOS process, that is: TT means typical corners for nmos and pmos; SS means slow corners for nmos and pmos; FF means fast corners for nmos and pmos; FS (or fnsp) means fast corner for nmos and slow corner for pmos; SF(or snfp) means slow corner for nmos and fast corner for pmos.

Table 1 shows the fall times tf simulation results of the demodulation signal GDA or GDB measured at the top of pixel array without latches.

TABLE 1

| Simulation results of fall times tf of the demodulation signal GDA or GDB measured at the top of pixel array without latches. | | | | | |
|---|---|---|---|---|---|
| Near End tf | TT | SS | FF | FS | SF |
| VDD = 1.45 V | 1.348 ns | 1.418 ns | 1.284 ns | 1.408 ns | 1.298 ns |
| VDD = 1.55 V | 1.293 ns | 1.351 ns | 1.235 ns | 1.348 ns | 1.241 ns |
| VDD = 1.65 V | 1.244 ns | 1.301 ns | 1.201 ns | 1.297 ns | 1.201 ns |

Table 2 shows the fall times tf simulation results of the demodulation signal GDA or GDB measured at the bottom of pixel array without latches.

TABLE 2

| Simulation results of fall times tf of the demodulation signal GDA or GDB measured at the bottom of pixel array without latches. | | | | | |
|---|---|---|---|---|---|
| Far End tf | TT | SS | FF | FS | SF |
| VDD = 1.45 V | 1.544 ns | 1.619 ns | 1.484 ns | 1.616 ns | 1.483 ns |
| VDD = 1.55 V | 1.489 ns | 1.545 ns | 1.437 ns | 1.550 ns | 1.431 ns |
| VDD = 1.65 V | 1.444 ns | 1.495 ns | 1.405 ns | 1.497 ns | 1.394 ns |

Table 3 shows the fall times tf simulation results of the demodulation signal GDA or GDB measured at the top of pixel array with latches.

TABLE 3

| Simulation results of fall times tf of the demodulation signal GDA or GDB measured at the top of pixel array with latches. | | | | | |
|---|---|---|---|---|---|
| Near End tf | TT | SS | FF | FS | SF |
| VDD = 1.45 V | 1.238 ns | 1.253 ns | 1.219 ns | 1.251 ns | 1.237 ns |
| VDD = 1.55 V | 1.227 ns | 1.243 ns | 1.212 ns | 1.237 ns | 1.217 ns |
| VDD = 1.65 V | 1.218 ns | 1.230 ns | 1.205 ns | 1.231 ns | 1.207 ns |

Table 4 shows the fall times tf simulation results of the demodulation signal GDA or GDB measured at the bottom of pixel array with latches.

TABLE 4

| Simulation results of fall times tf of the demodulation signal GDA or GDB measured at the top of bottom array with latches. | | | | | |
|---|---|---|---|---|---|
| Far End tf | TT | SS | FF | FS | SF |
| VDD = 1.45 V | 1.220 ns | 1.232 ns | 1.205 ns | 1.234 ns | 1.216 ns |
| VDD = 1.55 V | 1.209 ns | 1.224 ns | 1.196 ns | 1.219 ns | 1.198 ns |
| VDD = 1.65 V | 1.200 ns | 1.211 ns | 1.187 ns | 1.212 ns | 1.188 ns |

It should be recognized that the embodiments describe time diagrams with an exemplary ordering of diagrams. The specific ordering of method steps is, however, given for illustrative purposes only and should not be construed as binding. For example, steps signals Integration Enable, LSR, GDA, GDB or Latch Enable in FIG. 8 could be exchanged. The same holds true for FIG. 10

Note that the Present Technology can Also be Configured as Described Below:

(1) An electronic device comprising a clock-gated latch (40; 50; 60A; 60B; 91A; 91B) between two routing (36A, 36B) wires which transport a demodulation signal (GDA, GDB) from a demodulation driver (20A) to pixels (7) of a pixel column of a pixel array (21).

(2) The electronic device of (1) wherein the clock-gated latch (40; 50; 60A; 60B; 91A; 91B) improves, the fall time (tf) of a demodulation signal (GDA; GDB) transported by the routing wire (36A; 36B).

(3) The electronic device of (1) or (2), wherein the clock-gated latch (40; 50; 60A; 60B; 91A; 91B) is installed at the top side of the pixel column.

(4) The electronic device of anyone of (4), wherein the clock-gated latch (40; 50; 60A; 60B; 91A; 91B) is installed directly above a first pixel (7) of the pixel column.

(5) The electronic device of claim anyone of (1) to (2), wherein the clock-gated latch (40; 50; 60A; 60B; 91A; 91B) is installed at the bottom side of the pixel column.

(6) The electronic device of (5), wherein the clock-gated latch (40; 50; 60A; 60B; 91A; 91B) is installed directly below a last pixel (7) of the pixel column.

(7) The electronic device of (1) or (2) wherein a first clock-gated latch (60A; 91A) is installed at a top side of the pixel column, and a second clock-gated latch (60B; 91B) is installed at a bottom side of the pixel column.

(8) The electronic device of (7), wherein the first clock-gated latch (60A; 91A) is installed directly above a first pixel (7) of the pixel column and the second clock-gated latch (60B; 91B) is installed directly below a last pixel (7) of the pixel column.

(9) The electronic device of anyone of (1) to (8), wherein the clock-gated latch (40; 50; 60A; 60B; 91A; 91B) comprises two inverter gates.

(10) The electronic device of anyone of (1) to (9), wherein the clock-gated latch (40; 50; 60A; 60B; 91A; 91B) comprises a latch, enabling input (EN).

(11) The electronic device of claim anyone of (1) to (10), wherein a clock signal (Latch Enable; Latch Enable_2) enables/disables the clock-gated latch (40; 50; 60A; 60B; 91A; 91B).

(12) The electronic device of (11), wherein the clock signal (Latch Enable) is generated by a latch clock.

(13) The electronic device of claim (11), wherein the clock signal (Latch Enable_2) is generated on the basis of an overflow transistor gate signal (OFG).

(14) The electronic device of (13) or (14), wherein the clock signal (Latch Enable_2) is generated by inverting the overflow transistor gate signal (OFG).

(15) The electronic device of claim anyone of (1) to (14), wherein a contact pad for a power supply of the clock-gated latch (40; 50; 60A; 60B; 91A; 91B) is installed in a middle part of the pixel array (21).

(16) The electronic device of anyone of (1) to (15), wherein a first contact pad for a power supply of the clock-gated latch (40; 50; 60A; 60B; 91A; 91B) is installed at a left side of the pixel (21) array and a second contact pad for the power supply of the clock-gated latch (40; 50; 60A; 60B; 91A; 91B) is installed at a right side of a pixel array (21).

(17) The electronic device of anyone of (1) to (16), wherein the electronic device is a time of flight camera.

(18) A method, comprising controlling a clock-gated latch (40; 50; 60A; 60B; 91A; 91B) which is located between two routing (36A, 36B) wires which transport a demodulation signal (GDA, GDB) from a demodulation driver (20A) to pixels (7) of a pixel column of a pixel array (21).

(19) A computer program, comprising instructions, the instructions when executed on a processor controlling a clock-gated latch (40; 50; 60A; 60B; 91A; 91B) which is located between two routing (36A, 36B) wires which transport a demodulation signal (GDA, GDB) from a demodulation driver (20A) to pixels (7) of a pixel column of a pixel array (21).

The invention claimed is:

1. An electronic device comprising:
   a demodulation driver configured to output a demodulation signal;
   two routing wires electrically coupled to pixels of a pixel column of a pixel array, electrically coupled to the demodulation driver, and configured to transport the demodulation signal to the pixels;
   a clock-gated latch electrically coupled between the two routing wires that are configured to transport the demodulation signal from the demodulation driver to the pixels.

2. The electronic device of claim 1, wherein the clock-gated latch is configured to reduce a fall time of the demodulation signal.

3. The electronic device of claim 1, wherein the clock-gated latch is installed at a top side of the pixel column.

4. The electronic device of claim 3, wherein the clock-gated latch is installed directly above a first pixel of the pixel column.

5. The electronic device of claim 1, wherein the clock-gated latch is installed at a bottom side of the pixel column.

6. The electronic device of claim 5, wherein the clock-gated latch is installed directly below a last pixel of the pixel column.

7. The electronic device of claim 1, wherein the clock-gated latch includes a first clock-gated latch that is installed at a top side of the pixel column and a second clock-gated latch that is installed at a bottom side of the pixel column.

8. The electronic device of claim 7, wherein
   the first clock-gated latch is installed directly above a first pixel of the pixel column, and
   the second clock-gated latch is installed directly below a last pixel of the pixel column.

9. The electronic device of claim 1, wherein the clock-gated latch comprises two inverter gates.

10. The electronic device of claim 1, wherein the clock-gated latch comprises a latch enabling input interface.

11. The electronic device of claim 1, wherein a signal line is electrically coupled to the clock-gated latch and is configured to provide a clock signal to enable and disable the clock-gated latch.

12. The electronic device of claim 11, wherein a latch clock is configured to generate the clock signal.

13. The electronic device of claim 11, wherein the signal line is electrically coupled to a gate of an overflow transistor.

14. The electronic device of claim 13, wherein an inverter is electrically coupled between the gate of the overflow transistor and the clock-gated latch.

15. The electronic device of claim 1, wherein a contact pad for a power supply of the clock-gated latch is installed in a middle part of the pixel array.

16. The electronic device of claim 1, wherein a first contact pad for a power supply of the clock-gated latch is installed at a left side of the pixel array and a second contact pad for the power supply of the clock-gated latch is installed at a right side of a pixel array.

17. The electronic device of claim 1, wherein the electronic device is a time of flight camera.

18. A method, comprising:
   outputting a demodulation signal from a demodulation driver;
   transporting the demodulation signal to pixels of a pixel column of a pixel array via two routing wires electrically coupled to the pixels and to the demodulation driver; and
   operating a clock-gated latch electrically coupled between the two routing wires that transport the demodulation signal from the demodulation driver to the pixels.

19. A non-transitory computer readable medium storing a computer program including instructions, which when executed on a processor cause the processor to perform a method, the method comprising:

controlling a demodulation driver to output a demodulation signal to pixels of a pixel column of a pixel array via two routing wires electrically coupled to the pixels and to the demodulation driver; and controlling a clock-gated latch that is electrically coupled between the two routing wires.

* * * * *